United States Patent
Balasundaram et al.

(10) Patent No.: US 10,399,073 B2
(45) Date of Patent: Sep. 3, 2019

(54) HYDROCARBON SOLUBLE METAL COMPOSITION AND A METHOD OF MAKING IT THEREOF

(71) Applicant: INDIAN OIL CORPORATION LIMITED, Mumbai (IN)

(72) Inventors: Murugan Balasundaram, Faridabad (IN); Kochappilly Ouseph Xavier, Faridabad (IN); Alex Cheru Pulikottil, Faridabad (IN); Mohan Prabhu Kuvettu, Faridabad (IN); Brijesh Kumar, Faridabad (IN); Biswapriya Das, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 11 days.

(21) Appl. No.: 15/229,013

(22) Filed: Aug. 4, 2016

(65) Prior Publication Data
US 2017/0144142 A1    May 25, 2017

(30) Foreign Application Priority Data

Nov. 19, 2015    (IN) .......................... 4361/MUM/2015

(51) Int. Cl.
| | |
|---|---|
| *B01F 17/00* | (2006.01) |
| *B01J 31/00* | (2006.01) |
| *B01J 31/22* | (2006.01) |
| *C10M 159/18* | (2006.01) |

(52) U.S. Cl.
CPC ............ *B01J 31/22* (2013.01); *C10M 159/18* (2013.01); *B01J 2531/64* (2013.01); *B01J 2531/842* (2013.01); *B01J 2531/845* (2013.01); *B01J 2531/847* (2013.01)

(58) Field of Classification Search
CPC .... B01J 31/0239; B01J 23/28; C10M 159/18; C10M 133/04
USPC .................................. 508/165; 502/150, 164
See application file for complete search history.

(56) References Cited

U.S. PATENT DOCUMENTS

| | | |
|---|---|---|
| 3,161,585 A | 12/1964 | Gleim et al. |
| 3,331,769 A | 7/1967 | Gatsis |
| 3,657,111 A | 4/1972 | Gleim |
| 4,066,530 A | 1/1978 | Aldridge et al. |
| 5,578,197 A | 11/1996 | Cyr et al. |
| 7,842,635 B2 | 11/2010 | Zhou et al. |
| 8,183,189 B2 * | 5/2012 | Chen .................... C07F 11/005 508/167 |
| 8,426,608 B2 | 4/2013 | Nelson et al. |
| 8,445,399 B2 | 5/2013 | Wu et al. |
| 8,476,460 B2 | 7/2013 | Nelson et al. |

* cited by examiner

*Primary Examiner* — Prem C Singh
*Assistant Examiner* — Francis C Campanell
(74) *Attorney, Agent, or Firm* — Maschoff Brennan

(57) ABSTRACT

This present invention relates to oil-soluble metal compositions of metals and a method for its preparation. The composition finds application in catalysis as catalysts precursors or additives for in situ generation of nano dispersed metal/metal sulfide clusters for heavy oil hydroconversion and in the area of lubrication as friction modifiers.

14 Claims, 1 Drawing Sheet

Quaternary salt of Nitrogen

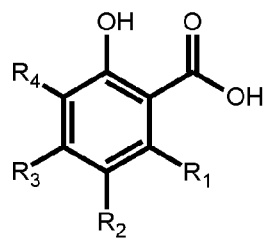
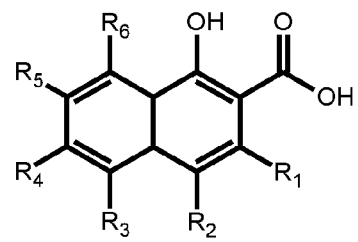
*Fig. 1 Mono aromatic beta hydroxy acid*
*Fig. 2 Poly aromatic beta hydroxy acid*
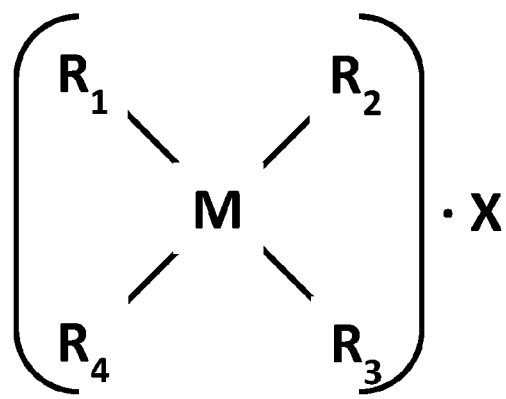
Fig: 3 Quaternary salt of Nitrogen

HYDROCARBON SOLUBLE METAL COMPOSITION AND A METHOD OF MAKING IT THEREOF

FIELD OF THE INVENTION

This invention relates to oil-soluble metal compositions comprising of molybdenum, tungsten, vanadium, chromium and/or any combination of these metals and a method for its preparation thereof.

BACKGROUND OF THE INVENTION

World demand for refined fossil fuels is ever-increasing and will eventually outstrip the supply of high quality crude oil. As the shortage of high quality crude oil increases there will be an increasing demand to find ways to process lower quality feedstocks and extract value added fuel components from them. Lower quality feedstocks contain relatively high quantities of hydrocarbons that have a boiling point of 524° C. or higher. They also contain relatively high concentrations of sulfur, nitrogen and/or metals. High boiling fractions typically have a high molecular weight and/or low hydrogen/carbon ratio like asphaltenes, Such compounds present in heavy oils are difficult to process and commonly cause coking and fouling of fixed bed hydroprocessing catalysts systems and hydroprocessing equipment. The coking and fouling reactions involved in hydroprocessing of heavy oil are undesirable as it greatly increases the catalyst and maintenance costs of processing heavy oils.

Converting heavy oil fractions into useful end products requires extensive processing, including reducing the boiling point of the heavy oil, increasing the hydrogen-to-carbon ratio and removing impurities such as metals, sulfur, nitrogen and carbon forming compounds. As the existing commercial catalytic hydrocracking processes, when used with heavy oil, rapidly undergo catalyst deactivation, new process technologies which enable to handle heavy oils more effectively are needed.

One promising technology for hydroprocessing heavy oils uses a hydrocarbon-soluble molybdenum salt that decomposes in the heavy oil during hydroprocessing to form, in situ, molybdenum sulfide, which can act as a hydroprocessing catalyst. The performance of oil soluble molybdenum catalysts depends significantly on the concentration of the catalyst in the heavy oil and on how well the catalyst precursor can be dispersed in the heavy oil. Improvements that can increase the percent of metal in the catalyst precursor while maintaining or improving solubility can improve the efficiency of hydrocracking heavy oils using oil soluble molybdenum compounds. Further, the degree of dispersion of the catalyst also strongly affects its performance. Although high levels of catalyst dispersion can be achieved by adopting efficient process conditions, addition of oil-soluble catalyst precursors seems the best way to promote a good dispersion of the catalyst species in the complex hydrocarbon matrix.

A significant problem with commercializing oil soluble molybdenum catalysts is the cost of the catalyst which leads to difficulty in terms of the economic viability of the overall process. However, even small improvements in catalyst performance can increase in output of fuels and other useful products and/or the reduced use of the catalyst and thus have a significant benefit to the overall cost of the hydrocracking process.

A number of oil-soluble metal catalyst used in hydroconversion process and their method of preparation are reported in various patents. Relevant patents related to the present invention are provided below:

One such process is disclosed in U.S. Pat. No. 5,578,197 to Cyr et al., in which the molybdenum sulfide catalyst, once formed in situ, is highly effective for breaking up of asphaltenes and thus preventing fouling and coking.

U.S. Pat. No. 8,445,399 B2 discloses a hydrocarbon soluble molybdenum catalyst precursor in a portion of the molybdenum atoms has an oxidation state of 3+ such that the average oxidation state is less than about 3.5+. Although such catalysts can form molybdenum sulfides for the hydroconversion of heavy oil feedstocks, the manufacture of precursor species requires complex procedures like treating with a reducing agent like hydrogen at high temperatures.

U.S. Pat. No. 7,842,635 reports a bimetallic catalyst system in which molybdenum along with another transition metal like Co, Ni or Fe is complexed with organic compounds like 2-ethyl hexanote to form an oil soluble catalyst system which is a mixture of complexes of molybdenum and the transition metal salt. However, since the Mo and transition metal complexes are prepared either sequentially at different temperatures or in separate vessels and then mixed, synergistic effects by their atomic dispersion has not been explored.

U.S. Pat. No. 3,161,585 discloses a hydro-refining process in which petroleum oil containing a colloidally dispersed catalyst selected from the group consisting of a metal of Groups VB and VIB, an oxide of said metal and a sulfide of said metal is reacted with hydrogen at hydro refining conditions. This patent teaches that the concentration of the dispersed catalyst, calculated as the elemental metal, in the oil is from about 0.1 weight percent to about 10 weight percent of the initial oil feedstock.

U.S. Pat. No. 3,331,769 discloses a hydrorefining process in which a metal component of Group VB, Group VIB or iron group metal colloidally dispersed in a hydrocarbonaceous oil is reacted in contact with a fixed bed of a conventional supported hydrodesulfurization catalyst in the hydrorefining zone. The concentration of the dispersed metal component which is used in the hydrorefining stage in combination with the supported catalyst ranges from 250 to 2,500 weight parts per million (wppm).

U.S. Pat. No. 3,657,111 discloses a process for hydrorefining asphaltene-containing hydrocarbon oil which comprises dissolving in the oil a hydrocarbon-soluble oxovanadate salt and forming a colloidally dispersed catalytic vanadium sulfide in situ within the oil and subsequently by reacting the resulting solution, at hydrorefining conditions, with hydrogen and hydrogen sulfide.

U.S. Pat. No. 4,066,530 discloses hydroconversion in the presence of an iron component and a catalytically active other metal component prepared by dissolving an oil-miscible metal compound in the oil and converting the metal compound in the oil to the corresponding catalytically active metal component.

In addition, oil-soluble metal compositions are also known for improving the properties of lubrication oils for internal combustion engines and in industrial lubricating applications. For example, U.S. Pat. Nos. 8,426,608 B2 and 8,476,460 disclose the preparation of molybdated succinimide complex. This invention disclosed that, in order to obtain lubrication oil that exhibits low friction and wear, the amine portion of the molecule is required to be pretreated with unsaturated carboxylic acids or carboxylic acid ester. The use of amide based molybdenum complex suitable for lubrication oil application was also reported by U.S. Pat. No.

8,183,189 in which the amide is derived from a carboxylic acid component and a polyamine component.

SUMMARY OF THE INVENTION

Existing technology for making oil-soluble metal compositions, however, suffers from a number of problems that have limited its widespread use in catalysts, additives and lubricants. These problems include poor oil solubility, lower stability leading to precipitation or decomposition of metal composition, insufficient metal loading for the desired process due to lower metal content in the metal composition, difficulty in practicing metal specific synthetic procedure and lower effectiveness for the process during application as catalysts, additives and lubricants.

To overcome above problems, there is a need for oil miscible/soluble metal additive to be easily synthesized from less expensive raw materials with high metal content, good oil solubility, longer stability in oil medium, and metal site amenable for hydrogenating heavier petroleum fractions. The present invention provides a convenient, economical method for making stable oil miscible/soluble compositions for incorporating metals such as Mo, W, V, Cr, Mn, Fe, Co and Ni in petroleum fractions at higher metal loadings wherein the resulting product is suitable for use as catalyst precursors in hydroprocessing of heavier hydrocarbons.

OBJECTIVE OF THE INVENTION

The main objective of the present invention is to develop a new method for making stable oil miscible/soluble mono and multi-metallic compositions incorporating metals such as Mo, W, V, Cr, Mn, Fe, Co and Ni in petroleum fractions at higher metal loadings wherein the resulting product is suitable for use as catalyst precursors in hydro processing of heavier hydrocarbons.

Another objective of the present invention is to develop a simple method for making oil-miscible metal compositions using less expensive raw materials and to increase the effective concentration of the metal in the as-synthesized metal-organic compositions.

BRIEF DESCRIPTION OF THE DRAWINGS

FIG. 1 illustrates the chemical structure of a monoaromatic hydroxy acid.
FIG. 2. Illustrates the chemical structure of a polyaromatic hydroxy acid.
FIG. 3 represents a quaternary salt of nitrogen.

DETAILED DESCRIPTION OF THE INVENTION

The oil-soluble metal compounds of the present invention are obtained by the reaction of a beta hydroxy acid, quaternary nitrogen salt and a metal source.

The beta hydroxy acids suitable for use in the present invention can be represented, but not limited, by the general formula $C_xH_{(x-y)}O_3$ where, x=7, 11, 15, etc., and y=1, 3, 5, etc. Examples of suitable acids for use in the present invention include mono and/or polycylic beta hydroxy acid analogs preferably mono and/or poly aromatic beta hydroxy acid analogs having but not limited in the FIGS. 1 and 2.

wherein $R_1$ to $R_6$ are independently selected from the group consisting of saturated or unsaturated, linear or branched chain, substituted or unsubstituted alkyl or alkoxy groups with carbon atoms preferably in the range of $C_1$-$C_{10}$; H; hydroxyl; fluoro; chloro; bromo; iodo; thiol; amino; cyano; thiocyano; nitro; carboxyl; carbonyl and amide. Exemplary compounds of the mono aromatic beta hydroxyl acid is: salicylic acid (each of $R_1$-$R_4$ are —H) and the poly aromatic beta hydroxyl acid is naphthoic acid (each of $R_1$-$R_6$ are —H).

Preferred beta hydroxy acid analogs are those wherein $R_1$ to $R_6$ are selected independently from the group consisting of H, hydroxyl, amino, diethylamino, dimethylamino, methyl, ethyl, propyl, butyl, ethoxy, methoxy, propoxy, butoxy, $C(O)CH_3$ $C(O)C_3H_7$, $C(O)C_4H_8$, $CO_2CH_3$, $CO_2C_3H_7$, $CH_2OCH_3$, $CH_2OC_3H_7$, COOH, chloro, fluoro, bromo, trifluoromethyl, nitro, thio, and cyano.

The most preferred beta hydroxy acid analogs are those wherein $R_1$-$R_6$ are selected independently from the group consisting of H, hydroxyl (OH) and alkyl ($C_1$-$C_{10}$).

Examples of these beta hydroxy acid analogs are selected from the group consisting of salicylic acid, 1-hydroxy-2-naphthoic acid, 1-hydroxy-2-anthroic acid, 2-hydroxy-3-naphthoic acid, 2-hydroxy-3-anthroic acid, 4-hydroxy-isophthalic acid, 2,6-dihydroxybenzoic acid, 5-nitrosalicylic acid, 5-iodosalicylic acid, 5-bromosalicylic acid, 5-iodosalicylic acid, 5-fluorosalicylic acid, 3-chlorosalicylic acid, 4-chlorosalicylic acid, 5-chlorosalicylic acid, and combinations thereof. The beta hydroxy acid analogs may be included as a substantially pure material, or as an extract obtained by suitable physical and/or chemical isolation from natural sources (e.g., plants). Most preferably, the beta hydroxy acid analog is selected from the group consisting of salicylic acid, 1-hydroxy-2-naphthoic acid, 1-hydroxy-2-anthroic acid, 2-hydroxy-3-naphthoic acid, 2-hydroxy-3-anthroic acid, and combinations thereof.

The quaternary salts suitable for use in the present invention are represented by the following structural formula, Wherein $R_1$ is a higher aliphatic alkyl group, which may be saturated or unsaturated, and having a carbon chain length of from 8 through 20 carbons; whereas $R_2$, $R_3$ and $R_4$ are saturated or unsaturated alkyl groups having from 1 to 4 carbons in chain length; and X is an ion selected from the group of ions consisting of chloride, bromide, iodide, nitrate, sulfate and salicylate ion; and M is nitrogen.

The quaternary nitrogen compounds of the present invention also include those cyclic quaternary nitrogen derivatives, such as the alkyl pyridinium and the alkyl piperidinium derivatives. In these quaternary cyclic nitrogen compounds, nitrogen atom is a part of the ring and the carbon-nitrogen linkage may be either saturated or unsaturated. The general formula for the unsaturated ring compounds is represented as $(R_1CH=N-R_2).X$, wherein the $R_1$ is an alkyl group, having from 1 through 4 carbons in chain length and $R_2$ is a higher alkyl saturated or unsaturated group, having from 8 through 20 carbons in chain length and X is a chloride, bromide, iodide, nitrate, sulfate and salicylate ions.

Examples of some quaternary nitrogen salts that are used in the present invention include and not limited to benzalkonium chloride, benzethonium chloride, benzododecinium bromide, bis(hydrogenated tallow alkyl)dimethyl chlorides, benzylcocoalkyldimethyl chlorides, benzoxonium chloride, cetalkonium chloride, cocamidopropyl betaine, cocamidopropyl hydroxysultaine, cetyltrimethyl ammonium bromide, cetyltrimethyl ammonium chloride, cetyltrimethyl ammonium iodide, cetyltrimethyl ammonium nitrate, cetyltrimethyl ammonium sulfate, cetyltrimethyl ammonium salicylate, cetyldimethylbenzylammonium chloride, cetyldimethylbenzylammonium bromide, cetyldimethylbenzylammonium iodide, cetyldimethylbenzylammonium sulfate, cetyldimethylbenzylammonium nitrate, cetyldimethylbenzylammonium salicylate, cetylpyridinium chloride, cetylpyridinium bromide, cetylpyridinium iodide, cetylpyridinium nitrate, cetylpyridinium sulfate, cetylpyridinium salicylate, methyltrioctylammonium chloride, didecyldimethyl ammonium chloride, dodecyldimethylbenzylammonium chloride, dimethyldioctadecylammonium chloride, domiphen bromide, hexamethylenetetramine chloroallyl chloride, polyquaternium, stearalkonium chloride, tetraoctylammonium bromide, and thonzonium bromide. Examples include monoalkyltrimethyl ammonium salts, dialkyltrimethylammonium salts, trialkyltrimethylammonium salts, methyldiethanolamine esterquats and triethanolamine esterquats.

Oil Solubility—

In lubricant formulations, oil soluble molybdenum compositions are generally used at very low concentrations (ppms) to percentage levels. However, the application of commercially available molybdenum salts in lubricants at higher concentrations is limited by the instability of the metal species in the lubricant composition, leading to the quicker formation of metal-sulfur species in the lubricant than the optimum rates. For application as catalyst in hydroconversion applications, the molybdenum compound must be soluble and dispersible in the heavy feedstocks containing varying concentrations of sulfur, metals, resins and asphaltenes. The present invention discloses a metal composition ranging up to 25 wt %, still highly soluble and stable in lubricant oil & heavy hydrocarbons with a shelf-life of more than a year. No decomposition or precipitation of the metal composition occurred during the storage.

Metal Incorporation—

The source of metal is a water soluble salt of the metal ion capable of reacting with the reaction product of the beta hydroxy acid and the quaternary compound. Suitable metal salts include, but are not limited to, salts of metals selected from the groups consisting of Groups IVB, VB, VIB, VIIB, VIII, rare earth compounds and combinations thereof. More preferably, metal salts include salts of metals selected from the group consisting of Ti, Zr, V, Nb, Cr, Mo, W, Mn, Re, Fe, Co, Ni, Cu, La, Ce, and combinations thereof. Even more preferably, metal salts include salts of metals selected from the group consisting of V, Nb, Cr, Mo, W, Mn, Fe, Co, Ni, Cu, La, Ce, and combinations thereof. Most preferably, the metal salts include salts of metals selected from the group consisting of V, Nb, Cr, Mo, W, Mn, Co, Ni, Cu, La, Ce and combinations thereof.

The exemplary source of V, Cr, Nb, Mo and W are the halides such as $MoCl_5$, $CrCl_3$, $WCl_6$, $NbCl_4$, $NbCl_5$, $VCl_3$, $VCl_5$, alkali, alkali-earth and ammonium salt of each metal such as ammonium vanadate, sodium vanadate, ammonium chromate, sodium chromate, ammonium niobate(V) oxalate hydrate, ammonium molybdate, sodium molybdate, potassium molybdate, calcium molybdate, ammonium tungstate, sodium tungstate and mixtures thereof.

The exemplary source of other metals are selected from the group consisting of halides, nitrites, nitrates, sulfates, acetates, chlorides, oxynitrates, oxychlorides, carbonates and alkali, alkali-earth and ammonium salt of metals such as ammonium trilactatotitanate, sodium titanate, ammonium tricarbonatozirconate, sodium zirconate, ammonium zirconate, sodium nickelate, sodium cobaltinitrite, sodium cobaltate, ammonium ferric citrate, ammonium ceric nitrate and combinations thereof. In the preferred embodiment of the present invention ammonium and/or sodium salt of the metals ions are used.

In the present invention, the order in which the components are reacted are not limited to the following methods, however preferred to react in any of the following methods. The beta hydroxy acid(s) and the quaternary compound(s) may be reacted to form an adduct. The adduct is then reacted with the metal source(s). In one embodiment, the beta hydroxy acid(s) and the metal source(s) can be reacted to form a complex. The complex is then reacted with the quaternary compound(s). In another embodiment, the quaternary salt(s) and the metal source(s) can be reacted to form a mixture. The salt/metal mixture is then reacted with the beta hydroxy acid(s). In still another embodiment, the beta hydroxy acid(s), the quaternary salt(s) and the metal source(s) can all be charged to the reactor at one time. In still another embodiment, the beta hydroxy acid(s), the quaternary salt(s), water and the metal source(s) can all be reacted to form a waxy product. This waxy product is separated and dissolved in hydrocarbon. In still another embodiment, the beta hydroxy acid(s), the quaternary salt(s) and hydrocarbon are reacted to form a composition. This composition is then reacted with the metal source in the presence of water.

Addition of water in these reactions accelerates the reaction rate and significantly improves the yields based on metal incorporation. After the completion of the reaction, water should be removed to drive the reaction to completion and maximize the amount of metal incorporated. In another embodiment, n-butanol is more preferably used instead of water to improve the solubility of beta hydroxy acids.

The typical molar stoichiometric of the raw materials used to prepare these oil soluble metal compounds is as follows:

| | |
|---|---|
| Beta hydroxyl acid | 1.0 |
| Quaternary salt | 0.5 to 1.2 (based on the acid) |
| Metal Source | 0.5 to 1.5 (based on the acid) |
| Water | 1 to 100.0 (based on the acid) |
| Hydrocarbon | 1 to 100.0 (based on the acid) |

An example of a preferred molar stoichiometry is as follows:

| | |
|---|---|
| Beta hydroxyl acid | 1.0 |
| Quaternary salt | 0.5 |
| Metal Source | 0.5 |
| Water | 5 |
| Hydrocarbon | 5 |

The reaction between the metal source, beta hydroxy acid and quaternary salt is typically carried out between 50 and 150° C. by combining the materials and heating with mixing at ambient conditions. The preferred reaction temperature is between 75 and 125° C. The reaction times are typically in the range from 0.5 hour to 6 hours. The hydrocarbon in these reactions acts as solvents and is chosen in such a way that it does not react with the beta hydroxy acid or quaternary salt. The preferred hydrocarbons are benzene, toluene, xylenes, heptane, decane, dodecane, and petroleum fractions like kerosene, light cycle oils, and various naphthenic, paraffinic and synthetic oils. The amount of solvent used is not critical but is kept to a minimum in order to achieve higher effective metal concentrations in the finished product. A typical example of a suitable method of molybdenum incorporation is as follows: Ammonium heptamolybdate and water are added to the beta hydroxy acid(s) and quaternary salt reaction mass and maintained at approximately 60-100° C. for duration of 1 to 4 hours. At the end of the reaction period the mixture is cooled and the product is removed by filtration. When hydrocarbon solvent is used in the reaction the organic phase is separated from the aqueous phase by decantation and the hydrocarbon solvent is removed by vacuum distillation. The oil-soluble molybdenum compound prepared by this process is a dark amber wax or viscous liquid free of reactive sulfur.

The molybdenum additives of the present invention can be used as catalyst precursors in the conversion of heavy hydrocarbons, anti-wear additives, friction modifiers, anti-oxidants and/or deposit control additives. The molybdenum complexes of the present invention have excellent solubility in a wide variety of base oils, organic solvents and petroleum feedstocks. Further, the complexes have high molybdenum incorporations preferably from about 5% to 25% by weight of the composition and are prepared from low cost raw materials by a simple synthetic route.

It will be appreciated that several of the details set forth below examples are provided to describe the following embodiments in a manner sufficient to enable a person skilled in the relevant art to make and use the disclosed embodiments.

The following examples are given for the purpose of further illustrating the invention. All percentages and parts are based on weight unless otherwise indicated.

Example 1: Oil-Soluble Mo Composition 700 g of ammonium hepta molybdate was dissolved in 7000 g of hot water. To that 1100 g of salicylic acid was added and the mixture was heated at 80° C. for 30 min under stirring. Then 7000 g of toluene was added to the mixture and heated at 80° C. for further 30 min yielding two separate layers. To this 140 g of cetyltrimethylammonium bromide was added with vigorous stirring. The organic layer was separated using a separating funnel and dried on solid NaCl powder. The clear yellow color solution thus obtained contains oil soluble Mo composition with $MoO_3$ concentration of 5.6 wt %.

Example 2: Oil-Soluble Mo Composition 700 g of ammonium hepta molybdate was dissolved in 7000 g of hot water. To that 1100 g of salicylic acid was added and the mixture was heated at 80° C. for 30 min under stirring. Then 70 g of toluene was added to the mixture and heated at 80° C. for further 30 min yielding two separate layers. To this 140 g of cetyltrimethylammonium bromide was added with vigorous stirring. The organic layer was separated using a separating funnel and dried on solid NaCl powder. The clear yellow color solution thus obtained contains oil soluble Mo composition with $MoO_3$ concentration of 19.7 wt %.

Example 3: Oil-Soluble Mo Composition 700 g of ammonium hepta molybdate was dissolved in 7000 g of hot water. To that 525 g of salicylic acid was added and the mixture was heated at 80° C. for 30 min under stirring. Then 70 g of toluene was added to the mixture and heated at 80° C. for further 30 min yielding two separate layers. To this 140 g of cetyltrimethylammonium bromide was added with vigorous stirring. The organic layer was separated using a separating funnel and dried on solid NaCl powder. The clear yellow color solution thus obtained contains oil soluble Mo composition with $MoO_3$ concentration of 24.8 wt %.

Example 4: Oil-Soluble Co Composition

In one reactor 291 g of cobalt II nitrate hexahydrate and 400 g of n-butanol was charged and stirred until dissolved completely. In an another reactor, 350 g of cetyltrimethylammonium bromide and 280 g of salicylic acid and 300 g of toluene was mixed together and heated at 70° C. for 1 hour. Addition of this hot solution to the above metal solution resulted in a dark blue color solution. This dark blue color solution was dried on solid NaCl powder.

Example 5: Oil-Soluble Ni Composition

In one reactor 291 g of nickel II nitrate hexahydrate and 400 g of n-butanol was charged and stirred until dissolved completely. In an another reactor, 350 g of cetyltrimethylammonium bromide and 280 g of salicylic acid and 300 g of toluene was mixed together and heated at 70° C. for 1 hour. Addition of this hot solution to the above metal solution resulted in a green color solution. This green color solution was dried on solid NaCl powder.

Example 6: Oil-Soluble Fe Composition

In one reactor 404 g of Iron III nitrate nonahydrate and 400 g of n-butanol was charged and stirred until dissolved completely. In an another reactor, 350 g of cetyltrimethylammonium bromide and 280 g of salicylic acid and 300 g of toluene was mixed together and heated at 70° C. for 1 hour. Addition of this hot solution to the above metal solution resulted in a green color solution. This green color solution was dried on solid NaCl powder.

Example 7: Oil-Soluble Co—Mo Bimetallic Composition 150 g of the product from Example 1 was mixed with 150 g of the product from Example 7. This mixture was heated at 90° C. for 30 min to obtain a clear greenish blue color solution containing Co—Mo bimetallic composition.

Example 8: Oil-Soluble Ni—Mo Bimetallic Composition 150 g of the product from Example 1 was mixed with 150 g of the product from Example 8. This mixture was heated at 90° C. for 30 min to obtain a clear greenish blue color solution containing Ni—Mo bimetallic composition.

Example 9: Oil-Soluble Fe—Mo Bimetallic Composition 150 g of the product from Example 1 was mixed with 150 g of the product from Example 9. This mixture was heated at 90° C. for 30 min to obtain a clear greenish blue color solution containing Fe—Mo bimetallic composition.

Example 10: Oil-Soluble Co—Mo Bimetallic Composition 500 g of the product from Example 1 was added with 100 g of cobalt II nitrate hexa hydrate and the mixture was heated at 90° C. for 30 min to obtain a purple color solution. To this 100 g of n-butanol was added followed by the addition of 150 g of cetyltrimethylammonium bromide and heated at 90° C. for further 30 min. The resulting greenish blue color solution was dried on NaCl powder to obtain Co—Mo bimetallic composition.

Example 11: Oil-Soluble Ni—Mo Bimetallic Composition 500 g of the product from Example 1 was added with 100 g of nickel II nitrate hexa hydrate and the mixture was heated at 90° C. for 30 min to obtain a purple color solution. To this 100 g of n-butanol was added followed by the addition of 150 g of cetyltrimethylammonium bromide and heated at 90° C. for further 30 min. The resulting greenish blue color solution was dried on NaCl powder to obtain Ni—Mo bimetallic composition.

Example 12: Oil-Soluble Fe—Mo Bimetallic Composition 500 g of the product from Example 1 was added with 100 g of Iron III nitrate nona hydrate and the mixture was heated at 90° C. for 30 min to obtain a purple color solution. To this 100 g of n-butanol was added followed by the addition of 150 g of cetyltrimethyl ammonium bromide and heated at 90° C. for further 30 min. The resulting greenish blue color solution was dried on NaCl powder to obtain Fe—Mo bimetallic composition.

Example 13: Oil-Soluble Ni—Mo-Bimetallic Catalyst 150 g of the product from Example 1 was mixed with 150 g of Ni-naphthenate solution. This mixture was heated at 90° C. for 30 min resulted in a clear green color solution.

We claim:

1. An oil-soluble metal composition comprising of reaction products of beta hydroxy acids, quaternary salts and a metal source, wherein the metal source comprises metal salts selected from the groups comprising of Group VIB;
   wherein the metal source is present in the range of 5 wt % to 25 wt % of the composition;
   wherein the beta hydroxy acid is represented by the general formula $C_xH_{(x-y)}O_3$ where x is 7, 11 or 15 and, correspondingly, y is 1, 3 or 5; and
   wherein the quaternary salt is having formula 3,

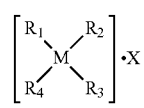

Formula 3 wherein:
$R_1$ is a higher aliphatic alkyl group, which is saturated or unsaturated, and having a carbon chain length of from 8 through 20 carbons;
$R_2$ and $R_3$ are saturated or unsaturated alkyl groups having from 1 to 4 carbons in chain length; and
$R_4$ is a radical selected from the group consisting of unsaturated and saturated aliphatic alkyl groups of from 1 to 4 carbons in chain length, aromatic, cyclic and heterocyclic groups having carbon atoms from 3 to 6, phenyl, thionyl, furfuryl and pyridyl groups; and
X is an ion selected from the group of ions consisting of chloride, bromide, iodide, nitrate, sulfate and salicylate ion; and
M is nitrogen.

2. The oil-soluble metal composition as claimed in claim 1, wherein beta hydroxy acids include mono and/or polycylic beta hydroxy acid analogs having formula 1 and 2:

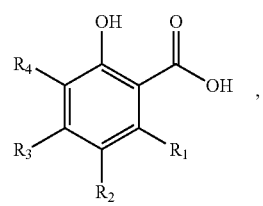

Formula 1

Mono aromatic beta hydroxy acid

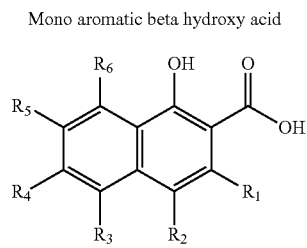

Formula 2

Poly aromatic beta hydroxy acid wherein $R_1$ to $R_6$ are independently selected from the group consisting of saturated or unsaturated, linear or branched chain, substituted or unsubstituted alkyl or alkoxy groups with carbon atoms preferably in the range of $C_1$-$C_{10}$; H; hydroxyl; fluoro; chloro; bromo; iodo;
thiol; amino; cyano; thiocyano; nitro; carboxyl; carbonyl and amide.

3. The oil-soluble metal composition as claimed in claim 1, wherein beta hydroxy acid analogs are selected from the group consisting of salicylic acid, 1-hydroxy-2-naphthoic acid, 1-hydroxy-2-anthroic acid, 2-hydroxy-3-naphthoic acid, 2-hydroxy-3-anthroic acid, 4-hydroxyisophthalic acid, 2,6-dihydroxybenzoic acid, 5-nitrosalicylic acid, 5-iodosalicylic acid, 5-bromosalicylic acid, 5-iodosalicylic acid, 5-fluorosalicylic acid, 3-chlorosalicylic acid, 4-chlorosalicylic acid, 5-chlorosalicylic acid, and combinations thereof.

4. The oil-soluble metal composition as claimed in claim 1, wherein the quaternary nitrogen salts include cyclic quaternary nitrogen derivatives, selected from the alkyl pyridinium and the alkyl piperidinium derivatives.

5. The oil-soluble metal composition as claimed in claim 1, wherein quaternary nitrogen salts are selected from the group consisting of benzalkonium chloride, benzethonium chloride, benzododecinium bromide, bis(hydrogenated tallow alkyl)dimethyl chlorides, benzylcocoalkyldimethyl chlorides, benzoxonium chloride, cetalkonium chloride, cocamidopropyl betaine, cocamidopropyl hydroxysultaine, cetyltrimethyl ammonium bromide, cetyltrimethyl ammonium chloride, cetyltrimethyl ammonium iodide, cetyltrimethyl ammonium nitrate, cetyltrimethyl ammonium sulfate, cetyltrimethyl ammonium salicylate, cetyldimethylbenzylammonium chloride, cetyldimethylbenzylammonium bromide, cetyldimethylbenzylammonium iodide, cetyldimethylbenzylammonium sulfate, cetyldimethylbenzylammonium nitrate, cetyldimethylbenzylammonium salicylate, cetylpyridinium chloride, cetylpyridinium bromide, cetylpyridinium iodide, cetylpyridinium nitrate, cetylpyridinium sulfate, cetylpyridinium salicylate, methyltrioctylammonium chloride, didecyldimethylammonium chloride, dodecyldimethylbenzylammonium chloride, dimethyldioctadecylammonium chloride, domiphen bromide, hexamethylenetetramine chloroallyl chloride, polyquaternium, stearalkonium chloride, tetraoctylammonium bromide, thonzonium bromide, hexadecyltributylphosphonium bromide, tetraphenylphosphonium chloride, methyltriphenoxyphosphonium iodide, monoalkyltrimethylammonium salts, dialkyltrimethylammonium salts, trialkyltrimethylammonium salts, methyldiethanolamine esterquats, triethanolamine esterquats, methyl bis (2-hydroxyethyl) alkyl ammonium chloride, where the carbon chain (C8-18) is derived from coconut, cottonseed, soya and tallow acids and methyl poly(oxyethylene) alkyl ammonium chloride, where the poly(oxyethylene) content is 3-15 moles and the alkyl group (C8-18) is derived from coconut, cottonseed, soya and tallow acid, Quaternary salts derived from the reaction products of fatty acids, trietanolamine and dimetylsulfate or mixture thereof.

6. The oil-soluble metal composition as claimed in claim 1, wherein the metal salts are water soluble salts of the metal ions capable of reacting with other reactants, the beta hydroxy acid and/or the quaternary salts, or their reaction product.

7. The oil-soluble metal composition as claimed in claim 6, wherein metal salts include salts of metals selected from the group consisting of Ti, Zr, V, Nb, Cr, Mo, W, Mn, Re, Fe, Co, Ni, Cu, La, Ce, and combinations thereof.

8. The oil-soluble metal composition as claimed in claim 7, wherein source of V, Cr, Nb, Mo and W are the metal halides, alkali, alkali-earth and ammonium salt of each metal, wherein:

(a) the metal halides is selected from a group comprising of $MoCl_5$, $CrCl_3$, $WCl_6$, $NbCl_4$, $NbCl_5$, $VCl_3$, $VCl_5$; and (b) alkali, alkali-earth and ammonium salt are selected from a group comprising of ammonium vanadate, sodium vanadate, ammonium chromate, sodium chromate, ammonium niobate (V) oxalate hydrate, ammonium molybdate, sodium molybdate, potassium molybdate, calcium molybdate, ammonium tungstate, sodium tungstate and mixtures thereof.

9. The oil-soluble metal composition as claimed in claim 6, wherein salts of metals are selected from the groups consisting of ammonium and/or sodium salt of the metal ions.

10. A process for the preparation of an oil-soluble metal composition as claimed in claim 1, the process comprising the steps of:

(a) reacting the beta hydroxyl acid (s), and the quaternary salt(s) in hydrocarbon solvent to form a composition,
wherein the beta hydroxy acid is represented by the general formula $C_xH_{(x-y)}O_3$ where x is 7, 11 or 15 and, correspondingly, y is 1, 3 or 5; and wherein the quaternary salt is having formula 3,

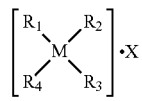

Formula 3 wherein:
$R_1$ is a higher aliphatic alkyl group, which is saturated or unsaturated, and having a carbon chain length of from 8 through 20 carbons;
$R_2$ and $R_3$ are saturated or unsaturated alkyl groups having from 1 to 4 carbons in chain length; and
$R_4$ is a radical selected from the group consisting of unsaturated and saturated aliphatic alkyl groups of from 1 to 4 carbons in chain length, aromatic, cyclic and heterocyclic groups having carbon atoms from 3 to 6, phenyl, thionyl, furfuryl and pyridyl groups; and
X is an ion selected from the group of ions consisting of chloride, bromide, iodide, nitrate, sulfate and salicylate ion; and
M is nitrogen;

(b) reacting the composition obtained in step (a) with the metal source in the presence of water to form a mixture, wherein the metal source comprises metal salts selected from the groups comprising of Group VIB; and
wherein the metal source is present in the range of 5 wt % to 25 wt % of the composition;

(c) heating the mixture obtained in step (b) at a temperature in the range 50-150° C. for a period of 0.5-6 hours to form a waxy product and (d) separating water from the waxy product to drive the reaction to completion and to obtain the oil-soluble metal composition.

11. The process as claimed in claim 10, wherein the beta hydroxy acid, the quaternary salt(s), and the metal source, the hydrocarbon and the water are reacted in any order/sequence.

12. The process as claimed in claim 11, wherein n-butanol is used instead of water to maximize the amount of metal incorporated.

13. The process as claimed in claim 10, wherein the molar stoichiometry of the raw materials used to prepare the oil soluble metal compounds are:

| | |
|---|---|
| Beta hydroxyl acid | 1.0 |
| Quaternary salt | 0.5 to 1.2 (based on the acid) |
| Metal Source | 0.5 to 1.5 (based on the acid) |
| Water | 1 to 100.0 (based on the acid) |
| Hydrocarbon | 1 to 100.0 (based on the acid). |

14. The process as claimed in claim 10, wherein the hydrocarbons are selected from the group comprising of benzene, toluene, xylenes, heptane, decane, dodecane, petroleum fractions like kerosene, light cycle oils, and various naphthenic, paraffinic and synthetic diluent oils.

* * * * *